(12) United States Patent
Polejaev et al.

(10) Patent No.: US 12,478,429 B2
(45) Date of Patent: Nov. 25, 2025

(54) MONITORING LIQUID MEDIUM CONDITIONS PROXIMATE A LASER LITHOTRIPSY TREATMENT AREA IN REAL TIME

(71) Applicant: GYRUS ACMI, INC., Westborough, MA (US)

(72) Inventors: Vladimir Polejaev, Middletown, CT (US); Kurt G. Shelton, Bedford, MA (US)

(73) Assignee: Gyrus ACMI, Inc., Westborough, MA (US)

( * ) Notice: Subject to any disclaimer, the term of this patent is extended or adjusted under 35 U.S.C. 154(b) by 363 days.

(21) Appl. No.: 17/820,297

(22) Filed: Aug. 17, 2022

(65) Prior Publication Data

US 2023/0090765 A1 Mar. 23, 2023

Related U.S. Application Data

(60) Provisional application No. 63/261,316, filed on Sep. 17, 2021.

(51) Int. Cl.
*A61B 18/20* (2006.01)
*A61B 18/26* (2006.01)
(Continued)

(52) U.S. Cl.
CPC .... *A61B 18/26* (2013.01); *A61B 2017/00057* (2013.01); *A61B 2018/00636* (2013.01)

(58) Field of Classification Search
CPC .... A61B 18/20; A61B 18/22–28; A61B 18/26
See application file for complete search history.

(56) References Cited

U.S. PATENT DOCUMENTS 6,538,739 B1 * 3/2003 Visuri .................. G01N 21/431
356/497
9,970,955 B1 5/2018 Homyk et al.
(Continued)

FOREIGN PATENT DOCUMENTS

DE 102022121580 3/2023
JP H0525495 2/1993
(Continued)

OTHER PUBLICATIONS

"Japanese Application Serial No. 2022-148348, Notification of Reasons for Rejection mailed Sep. 4, 2023", W English Translation, 8 pgs.
(Continued)

*Primary Examiner* — Lynsey C Eiseman
(74) *Attorney, Agent, or Firm* — Schwegman Lundberg & Woessner, P.A.

(57) ABSTRACT

Disclosed herein are systems and methods for monitoring a condition associated with a medium proximate a target region. The system comprising a surgical laser, a surgical fiber coupled to the surgical laser for delivering laser light to a target region and receiving at least a portion of the laser light reflected from the target region. The system further comprising a processor configured to analyze the collected reflected laser light and determine, based at least in part on the analysis of the reflected laser light a value of a parameter associated with the medium proximate the target region.

25 Claims, 8 Drawing Sheets

(51) Int. Cl.
*A61B 17/00* (2006.01)
*A61B 18/00* (2006.01)

(56) References Cited

U.S. PATENT DOCUMENTS

| | | | |
|---|---|---|---|
| 2005/0150830 A1 | 7/2005 | Laugharn et al. | |
| 2009/0149845 A1* | 6/2009 | Brown | A61B 18/24 606/12 |
| 2011/0090325 A1 | 4/2011 | Hauger et al. | |
| 2014/0276101 A1* | 9/2014 | Asselin | A61B 5/0084 600/407 |
| 2015/0057647 A1 | 2/2015 | Mitchell et al. | |
| 2018/0084982 A1* | 3/2018 | Yamashita | A61B 18/245 |
| 2018/0344405 A1* | 12/2018 | Brown | A61B 18/22 |
| 2020/0015892 A1* | 1/2020 | Kim | A61B 18/1206 |
| 2021/0038306 A1* | 2/2021 | McLoughlin | A61B 5/0084 |
| 2021/0251502 A1 | 8/2021 | Oberlin et al. | |
| 2021/0290305 A1* | 9/2021 | Cook | A61B 18/245 |
| 2021/0378745 A1* | 12/2021 | Fukushima | A61B 18/26 |
| 2022/0361951 A1* | 11/2022 | Brinkmann | A61B 18/26 |

FOREIGN PATENT DOCUMENTS

| | | |
|---|---|---|
| JP | H08510830 | 11/1996 |
| JP | 2005524441 | 8/2005 |
| JP | 2009213589 | 9/2009 |
| JP | 2009533076 | 9/2009 |
| JP | 2016538026 | 12/2016 |
| JP | 2019510531 | 4/2019 |
| JP | 2020163037 | 10/2020 |
| JP | 7509838 | 7/2024 |
| WO | 03092520 | 11/2003 |
| WO | 2017141524 | 8/2017 |
| WO | 2019026347 | 2/2019 |
| WO | 2020174686 | 9/2020 |
| WO | WO-2020174686 A1 * | 9/2020 ............. A61B 18/26 |

OTHER PUBLICATIONS

"Indian Application Serial No. 202244048780, First Examination Report mailed Feb. 27, 2024", 9 pgs.

"Japanese Application Serial No. 2022-012501, Response filed Apr. 4, 2024 to Final Notification of Reasons for Refusal mailed Jan. 15, 2024", w English Translation, 9 pgs.

"Japanese Application Serial No. 2022-148348, Response filed Dec. 1, 2023 to Notification of Reasons for Rejection mailed Sep. 4, 2023", w english claims, 11 pgs.

"Japanese Application Serial No. 2022-012501, Final Notification of Reasons for Refusal mailed Jan. 15, 2024", w English Translation, 8 pgs.

"Japanese Application Serial No. 2024-99660, Notification of Reasons for Rejection mailed Aug. 26, 2025", W English Translation, 6 pgs.

* cited by examiner

MONITORING LIQUID MEDIUM CONDITIONS PROXIMATE A LASER LITHOTRIPSY TREATMENT AREA IN REAL TIME

CROSS-REFERENCE TO RELATED APPLICATION

This application claims the benefit of priority to U.S. Provisional patent application Ser. No. 63/261,316, filed Sep. 17, 2021, the contents of which are incorporated herein by reference in their entirety.

TECHNICAL FIELD

The present disclosure relates to a system for monitoring the liquid medium conditions proximate a laser lithotripsy treatment area.

BACKGROUND

During medical procedures that utilize a scope (e.g., an endoscope, ureteroscope, or the like) such as lithotripsy procedures, there is a space between the tip of a fiber or scope that can contain debris, blood, or another liquid medium. The characteristics of the liquid in the treatment area/area of the procedure can change very rapidly as the procedure progresses. As a result of energy delivery to a target, such as a kidney stone, conditions in the liquid media such as temperature, pressure, the quantity of vapor bubbles, or the like, can change very rapidly (e.g., within ~1 ms) as the procedure progresses.

SUMMARY

During endoscopic procedures, such as lithotripsy or other similar procedures which employ, use, utilize, or the like, laser light or laser radiation (e.g., tissue ablation procedures, kidney stone ablation or removal, or the like) conditions in the liquid medium in the area of the procedure can change very quickly. For example, the temperature of the liquid medium can increase as laser radiation is delivered to a treatment area and absorbed by the liquid. This can cause the liquid to reach a temperature that is too high (e.g., above 43 degrees Celsius), which can be dangerous to human or animal tissue. For example, tissue necrosis, which can occur when temperatures in the body reach 43° C. Similarly, when irrigation fluid is introduced to clear debris so that a camera on the distal end of the scope can allow a surgeon to see a target more clearly, pressure inside an organ (e.g., inside a kidney) can increase to an undesired or dangerous level. Further, if the fluid return through the scope becomes clogged, pressure inside the organ can increase because irrigant (e.g., saline or the like) can still be introduced without a properly functioning exit channel.

In addition to damage to tissue or organs that can occur when a temperature or pressure in the treatment area increase to an unacceptable or otherwise dangerous level, the efficiency of the ablation can be reduced. For example, debris and blood can collect or aggregate on the tip of the scope and, especially when combined with high local temperatures, can cause contamination of the tip of the scope which can lower the overall ablation efficiency because less laser light/radiation can reach the intended target. Therefore, there is a need to monitor the conditions of the media proximate the endoscopic treatment or diagnostics site in real-time, to address issues such as changes in temperature or pressure proximate to the distal end of the endoscope.

One way to monitor conditions of the liquid media such as temperature and pressure during lithotripsy or other laser procedures is to analyze reflected laser light intensity modulation. The laser light can be reflected as light speckles creating a "speckle field" or "caustic field" which can be used to determine the current and changing state/condition of the media making up the area between the scope tip and the target stone or tissue. For example, the changing intensity of the reflected laser speckles or light caustics can be monitored to infer factors impacting the media such as temperature, pressure, and irrigation flow problems. One advantage of being able to infer factors such as temperature, pressure, and irrigation flow, is that the system does not have to include temperature or pressure sensors and use additional resources (e.g., power) that such sensors would require. And, by using the speckle field to determine changes in parameters such as temperature and pressure can allow the system to adapt to and mitigate the changing conditions more efficiently.

An example system to monitor the conditions of the liquid medium can include a surgical laser, a surgical fiber configured to be connected to the surgical laser, and a surgical scope (e.g., an endoscope or the like) configured to be connected to the surgical fiber, such as at a distal end of the surgical fiber. The surgical fiber can include an optical fiber. The surgical laser can include an ablation laser configured to emit laser radiation, such as laser light, through the optical fiber and the surgical fiber. In addition to an ablation laser used to ablate tissue in a body or organ in the body, the surgical laser can also include a laser configured to emit visible laser light such as to allow a surgeon to better visualize a surgical or treatment area. The surgical laser system can also include an optical splitter configured to collect at least a portion of laser light reflected off from a target such as a kidney stone or a piece of tissue and reflected back toward the scope. Additionally, or alternatively, the reflected laser light can be collected by way of a dedicated fiber attached to the surgical laser.

The surgical laser can also include a processor which can analyze at least a portion of the reflected laser light collected by the optical splitter at a first time and determine based on the analysis of the reflected laser light collected at the first time, a first value for a parameter (e.g., a temperature, a pressure, an amount/number of bubbles, etc.) associated with the liquid medium. The processor can further determine whether the first value is above a first predetermined threshold, below a second predetermined threshold, within a particular range or beyond a predetermined range, and based on that determination, apply a mitigation. Additionally, or alternatively, the processor can analyze at least a portion of reflected laser light collected at a second time to determine a second value for the parameter. The second value of the parameter can be compared against the predetermined threshold(s), range(s) and/or the first value and, based on that comparison (e.g., if the comparison reveals that the parameter has changed an undesired amount), apply a mitigation.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

During endoscopic medical procedures such as lithotripsy, laparoscopy, or the like, the characteristics of the liquid medium in the area of the procedure can change very rapidly. For example, the media conditions can change in temperature, pressure, in the quantity of vapor bubbles resulting from energy delivery to the target (e.g., a kidney stone, or a piece of tissue being ablated), or the like. Such changes in the liquid medium conditions can not only inhibit or lower the efficiency of the procedure, such as making the ablation less efficient, but can be harmful to the patient. For example, if the temperature at the treatment site becomes too high, the tissue being ablated or the tissue near the treatment site can be damaged. Similarly, pressure inside the body or an organ such as the kidney can increase during procedures. For example, introducing irrigation fluid via the scope to clear debris can put undue pressure on associated organs. Similarly, the irrigation return channels can become clogged which can increase pressure in the body as well as clouding, obscuring, or the like, endoscopic visualization and interfere with the procedure. Further, debris and blood can accumulate near the endoscopic tip, especially at high temperatures, which can contaminate the tip of the scope and reduce ablation efficiency.

Hence, there is a need to monitor the conditions of the liquid media proximate the endoscopic treatment or diagnostics site in real time. The disclosed systems and methods provide a solution to monitor the liquid medium proximate a treatment area (e.g., the area between the endoscopic tip and the target) in real-time, and based on an analysis of the conditions of the liquid medium, automatically apply an appropriate mitigation in real-time to correct, alleviate, or the like, the characteristic posing a problem or danger to the procedure, the patient, or both.

Figure 1:
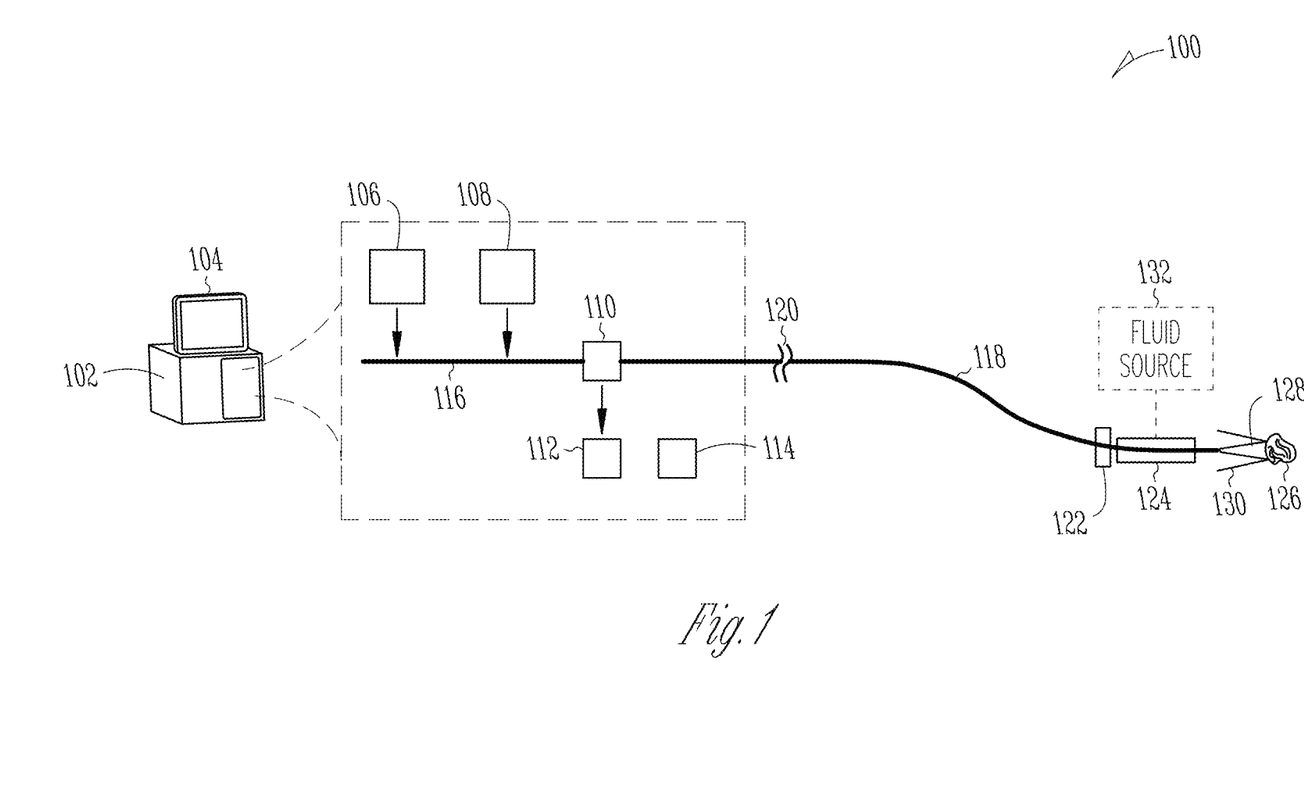
FIG. 1 illustrates an example system for monitoring liquid medium conditions proximate a laser treatment area.

FIG. 1 illustrates an example system 100 for monitoring liquid medium conditions proximate a laser treatment area. The system 100 can include a surgical laser 102. The system may optionally include a graphical user interface 104, which may include a touchscreen or other input mechanism configured to operate, control, or the like, the surgical laser 102. Included in the interior of the surgical laser 102 (as denoted by the dashed box) can be one or more laser sources configured to emit laser radiation. The laser sources can include an ablation laser 106 and/or a probe laser 108. The ablation laser 106 can emit infrared radiation while the probe laser 108 can emit visible light to show where the tip of the scope (and therefore where the ablation energy from the ablation laser 106) is aimed, or can be used to illuminate a target 126. The target 126 can be a piece of tissue, debris, or an object, such as a kidney stone which is to be ablated, or the like. Thus, the emitted laser radiation/light 128 can be emitted from the ablation laser 106 or the probe laser 108 independently of each other or in conjunction with each other, meaning that the emitted laser radiation/light 128 emitted from the surgical laser can be visible, invisible, or both (e.g., a combination of infrared light and visible light).

The emitted laser radiation/light 128 from the laser sources 106, 108, can be emitted through an optical fiber 116 connected to a surgical fiber 118 via an optical connector 120. In an example, the structure of the surgical fiber 118 can be the same or different from that of the optical fiber 116 The surgical fiber 118 can be located wholly or partially outside the surgical laser 102. The emitted laser radiation/light 128 can thus be emitted from the laser sources 106, 108, through the optical fiber 116, the optical connector 120, and the surgical fiber 118, to a distal end of the surgical fiber 118 to which a scope 124, such as an endoscope, a ureteroscope, or the like, can be attached. In an example, a fluid source 132 can be connected to the scope 124. The fluid source 132 can be a separate or independent system that can deliver fluid via the scope 124 (e.g., via a working channel of the scope 124). In an example, the laser sources 106, 108, can be single-mode lasers, multi-mode lasers, or the like, and the optical fiber 116, can be a single-mode fiber, a multi-mode fiber, or the like. Where a single-mode laser and fiber can transmit a collimated laser spot, a multi-mode laser and fiber can produce thousands or more small spots, akin to pixels that "blink", producing a speckle field or speckle pattern (as described in FIG. 2 below), which typically occur in diffuse reflections of laser light. In an example, at least a portion of the emitted laser radiation/light 128 emitted from the distal end of the surgical fiber 118 and the scope 124 can be reflected off of a target 126 through a medium between the tip of the scope 124 and the target 126 resulting in the speckle pattern.

Returning to FIG. 1, the surgical laser 102 can further include an optical splitter 110, configured to collect at least a portion of the reflected laser light 130 passing through the aperture of the surgical fiber 118; the collected laser light can form the resulting speckle field. In an example, the optical splitter 110 can be replaced with a dedicated fiber configured to collect at least a portion of the reflected laser light 130. In an example, the portion of reflected laser light 130 collected by the optical splitter 110 or dedicated fiber can be sent to a processor 112 in connection with the surgical laser 102. The processor 112 can analyze the portion of the reflected laser light 130 collected by the optical splitter 110, and determine, based on the analysis of the reflected laser light 130, a first value for a parameter. In an example, the parameter can be a temperature value or range, a pressure value or range, an amount/number of bubbles in the liquid media, or any other similar parameter desired to be observed, monitored, tracked, or the like. In an example, multiple parameters can be monitored at a time, and what parameters are monitored may vary depending on the procedure being performed.

The surgical laser 102 may optionally or additionally include a controller 114 communicatively coupled to the processor 112. In response to a determination that the first value for the parameter is at least one of above an upper threshold value, below a lower threshold value, within a range, or beyond a range, the processor can be further operable to cause a mitigation to be applied. The mitigation may include causing the controller 114 to cause a surgical fiber actuator 122 configured to be connected to the surgical fiber 118 to adjust a location of at least a portion of the surgical fiber 118. For example, the surgical fiber actuator 122 can cause the surgical fiber 118, such as the portion of the surgical fiber 118 connected to the scope 124 to change its location (e.g., move closer to or away from the target). In an example, the mitigation can include causing a change in the intensity of the emitted laser radiation/light 128 (e.g., stopping, reducing, lowering, or the like), change in other parameters (e.g., duty cycle, pulse width, or the like) of the laser light, or the mitigation can be to cause an irrigation fluid such as saline to be emitted from the scope 124. In an example, the mitigation can be to change the flow rate of the irrigation fluid emitted from the scope 124. It is understood that any one of these mitigation techniques or any other suitable mitigation technique can be applied independently or in conjunction with each other as desired or appropriate. In an example, the processor 112 can be configured to automatically select and cause one or more suitable mitigation techniques to be applied. By configuring the processor to automatically select and cause an appropriate mitigation to be applied based on the analysis of the reflected laser light 130 and the determined value of the parameter, the system can provide increased ablation efficiency as the processor can cause the mitigation to be applied faster than a human can react.

The Speckle Field

As laser radiation/light is emitted from a tip portion of the surgical fiber, such as at a distal end where an endoscope or other similar scope can be attached, and reflected off the target 126, a speckle field of moving light speckles can be produced in the liquid medium (because the liquid medium is not uniform) between the tip of the fiber/scope and the target, such as a kidney stone or piece of tissue. A portion of the light speckles can be reflected back toward the tip of the fiber or scope and into the aperture of the fiber to be collected by the optical splitter. The surgical fiber can work as a "pinhole" for the reflected speckles of light, so not all of the light/speckles will be reflected back into the fiber. The reflected speckle field can be monitored (e.g., observing how the light speckles move or otherwise change state) in order to determine a value for a parameter such as a temperature or pressure associated with the liquid medium.

Figure 2:
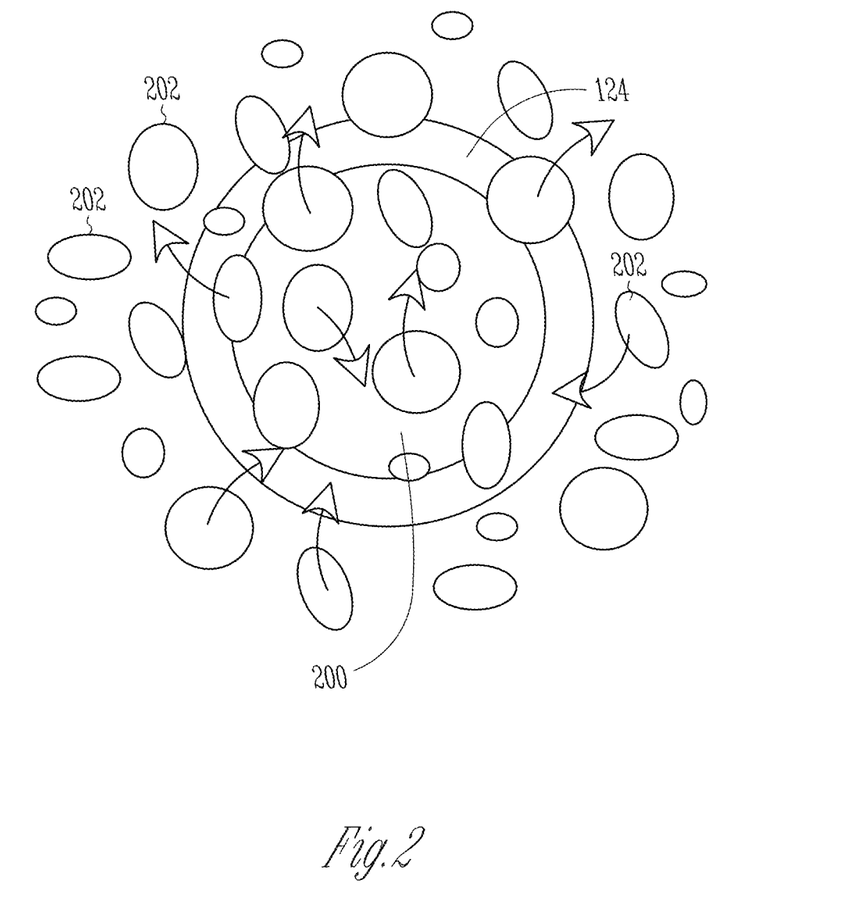
FIG. 2 illustrates an example of reflected laser light speckles/light caustics at the tip of a fiber and scope.

FIG. 2 illustrates an example of reflected laser light speckles/light caustics at the tip of a fiber and scope. In the specific example of FIG. 2, after the laser radiation/light is emitted from a tip portion of the surgical fiber, such as through an aperture 200 of surgical fiber 118, where scope 124 is connected, a speckle field comprising multiple laser speckles 202 can be produced as the emitted laser radiation/light 128 is reflected off of the target 126. The speckles 202 can move (as shown by the arrows) due to, for example, a change in the liquid medium; this can thereby cause the speckles 202 to appear to blink, flicker, shimmer, glimmer, sparkle, flash, jiggle, or the like. At least a portion of the reflected speckles 202 produced by the reflected laser light 130 reflected off of the target 126 can be reflected back through the liquid medium between the scope 124 and the target 126 and go back through the aperture 200 of the surgical fiber 118 to be captured by the optical splitter 110. In an example, the aperture 200 of the surgical fiber 118 can be between 150 micro-meters (μm) and 1 milli-meter (mm), inclusive, in diameter. It is understood that the diameter of the aperture 200 can be of any suitable size depending on the medical or surgical procedure being performed, the scope being used, or any other factor on which the diameter of the surgical fiber 118 depends.

The amount of light that is reflected back into the fiber (and toward the optical splitter 110) can depend on various factors, such as the size of the aperture 200 of the surgical fiber 118, the type of liquid medium, the conditions present in the liquid medium, or the like. In various embodiments, some of the speckles 202 can be collected by the optical splitter 110 and analyzed by the processor 112.

Figure 3:
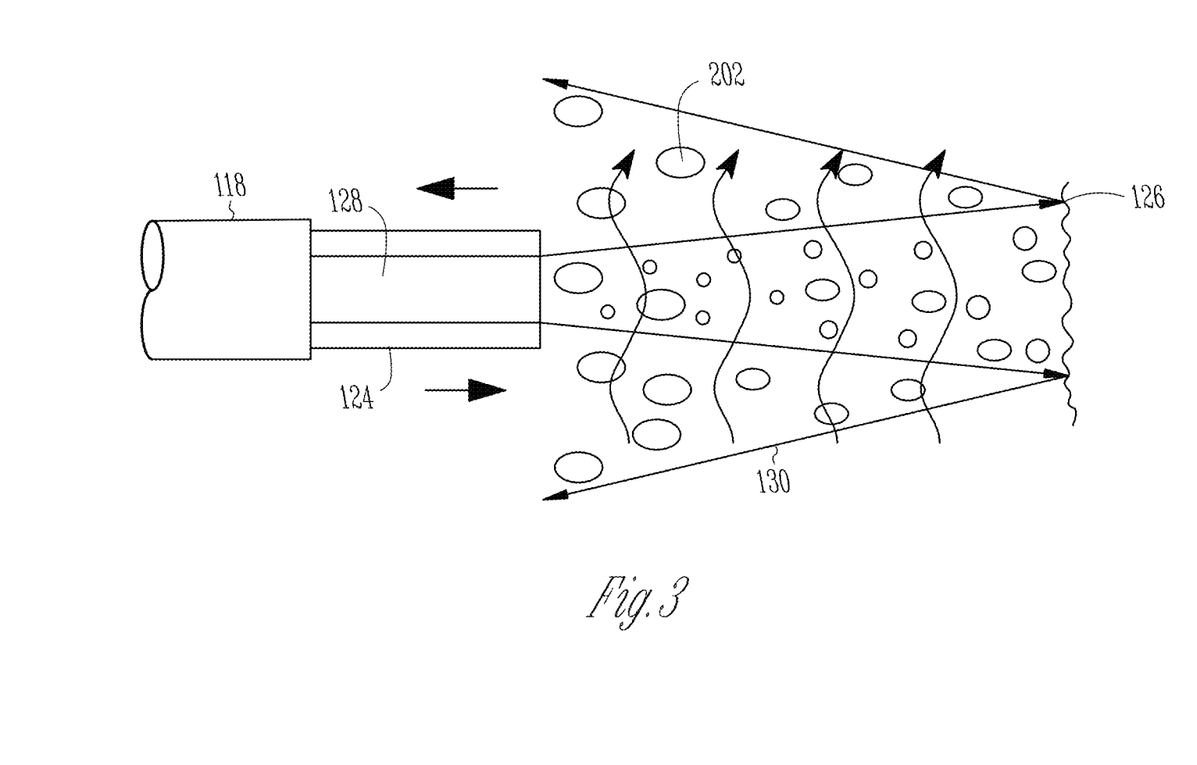
FIG. 3 illustrates an example of reflected laser light in a medium between the tip of a scope and a target.

FIG. 3 illustrates an example of reflected laser light in a medium between the tip of a scope and a target. In the example of FIG. 3, the laser radiation/light 128 can travel, pass, propagate, or the like, through the surgical fiber 118 and be emitted through a tip (e.g., a distal end/portion) of the surgical fiber 118 or a tip of the scope 124 (as illustrated by the lower arrow) and travel through a liquid medium toward the target 126. The emitted laser radiation/light 128 can reflect off of the target 126, in the form of the reflected laser light 130, causing the speckles 202 to form a speckle field as described above. In an example, the surgical fiber 118 can be used as a limited light aperture. The speckles 202 are always moving in the medium due to, for example a change in a condition of the liquid medium as a result of application of the laser radiation/light, and thus the size of the speckles 202 and/or the space/distance between speckles 202 can change; this in turn may cause a change in the intensity of the reflected laser light 130. This change in the intensity of the reflected laser light 130 can correspond to a modulation of the refractive index of the medium (as illustrated by the "wavy" arrows in FIG. 3). The modulation of the refractive index of the medium can correspond to a change in a parameter associated with the liquid medium being monitored, such as temperature, pressure, number/amount of bubbles, or the like. Based on the change in the parameter, a mitigation can be applied as discussed above for FIG. 1.

Analysis of the Speckle Field

Multi-mode lasers and optical fibers produce a laser radiation spatially modulated in phase. The phase modulation can be converted to laser light intensity variations, which is the speckle field described above. The speckle field/light intensity variation oscillates and forms a complex curve that changes over time. If this curve is monitored at a high speed (e.g., between 10 kilohenry (KH) and 100 KH), the curve can be recorded/graphed with respect to time, and in real-time the processor can apply a form of statistical analysis (e.g., a Fourier transform) which will allow for monitoring and analyzing the statistical change in the light intensity. This allows for conditions (e.g., temperature, pressure, or the like) in the medium to be inferred without directly measuring temperature, pressure, or the like.

Figure 4A:
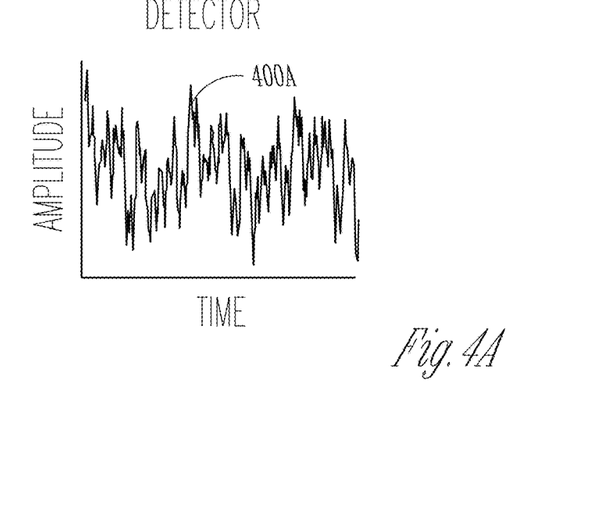
FIGS. 4A-C illustrate an example of a detected signal from the reflected laser light, the detected signal transformed into the frequency domain, and the frequency criteria versus time.
Figure 4B:
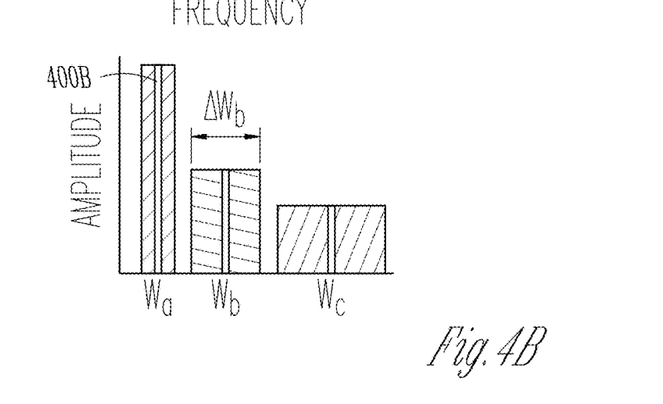
Figure 4C:
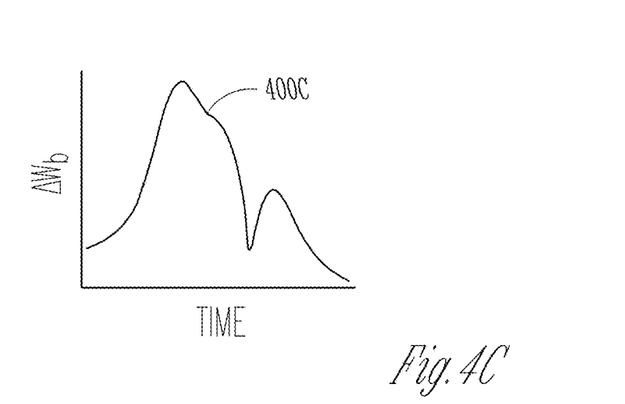

FIGS. 4A-C illustrate an example of a detected signal from the reflected laser light, the detected signal transformed into the frequency domain, and the frequency criteria versus time. FIG. 4A illustrates a real-time detected signal 400A of the speckles 202 reflected back from the target 126 through the medium, into the surgical fiber 118, and collected by the optical splitter 110. The real-time detected signal 400A represents the amplitude of the proportional reflected laser light at the aperture 200 over time. The real-time detected signal 400A can be transformed into the frequency domain as illustrated in FIG. 4B. The amplitude of the frequency represented signal 400B can represent a single frequency such as $\omega_a$, or split into multiple frequencies such as $\omega_a$, $\omega_b$, and $\omega_c$. In an example, each of the frequencies and/or a combination thereof can represent a different parameter/characteristic present in the liquid medium such as temperature, pressure, an amount of bubbles, or the like. Further, the change in one of the frequencies (such as denoted by the $\Delta\omega_b$) or the combination thereof can represent a change in the parameter/characteristic present in or a condition of the liquid medium over time. For example, FIG. 4C depicts a monitored change 400C in the frequency over time. In one embodiment, when the change exceeds an upper threshold value (e.g., more than 50%, 80% or, in some embodiments, 100%), falls below a lower threshold value (e.g., more than 50%, 30% or, in some embodiments, 10%), is within a range of values, or the like, a mitigation can be applied. For example, the change in frequency over time 400C can indicate a change in temperature in the liquid medium. When the change in frequency over time 400C rises above an upper threshold, it can represent an undesirable rise in temperature in the liquid medium (e.g., to a temperature that causes a clinical damage to the tissue), and a mitigation such as causing a change in the intensity of the emitted laser radiation/light 128 (e.g., stopping, reducing, lowering, or the like), can be applied. Additionally, or alternatively, the mitigation can be to cause irrigation fluid such as saline to be emitted from the scope 124 to lower, reduce, or the like, the temperature of the liquid medium. Similarly, the change in frequency over time 400C rising above an upper threshold can indicate an undesirable increase in pressure in the liquid medium, and an appropriate mitigation can be applied.

In an example, a display may be associated with, connected to, or the like, the scope 124 for displaying the speckle pattern. By tracking movement of the speckle pattern (e.g., based on a displayed video of the speckle pattern), a change in a condition of the liquid medium may be determined. Additionally or alternatively, movement of the speckle pattern can be combined with the intensity information of the speckle pattern to determine the change in a condition of the medium.

In an example, machine learning, both supervised and unsupervised, can be used to determine a correlation between the spectral patterns of the detected signals in the frequency domain and the conditions (or changes in the conditions) of the medium. Subsequently, the condition of the medium can be determined by applying the learned correlation and the detected real-time intensity of the reflected speckles.

Figure 5:
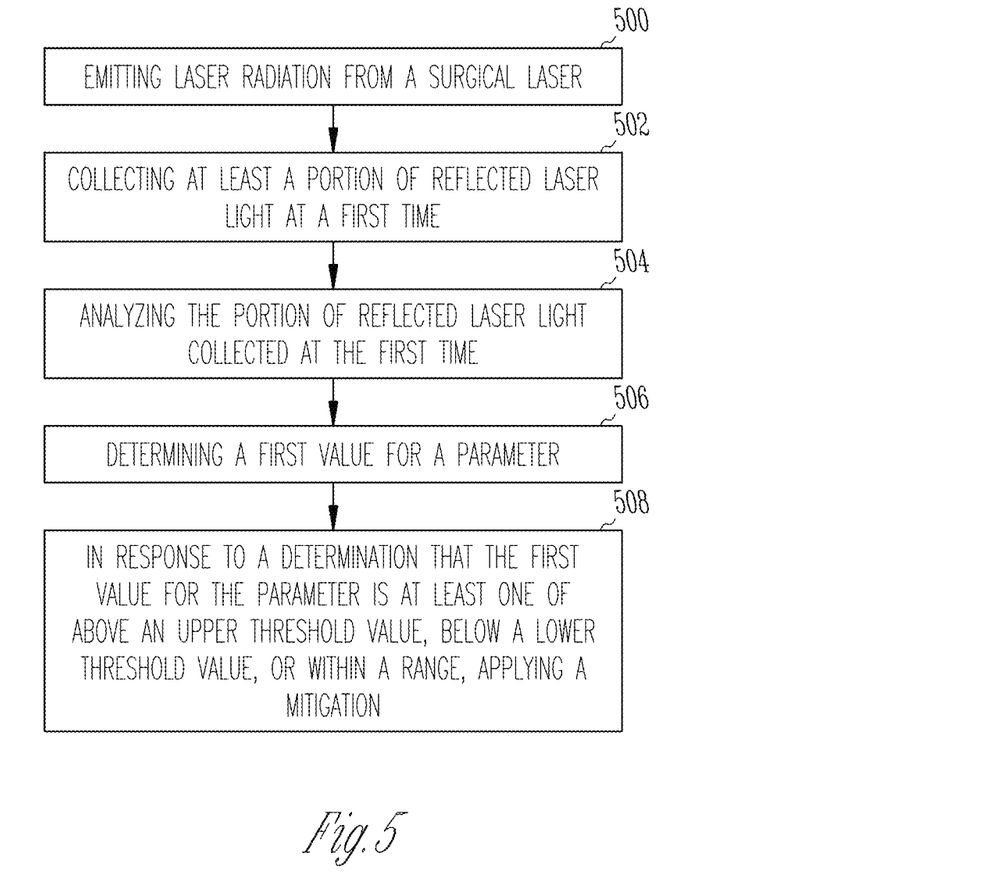
FIG. 5 illustrates an example method for monitoring liquid medium conditions proximate a laser lithotripsy treatment area.

FIG. 5 illustrates an example method for monitoring liquid medium conditions proximate a laser treatment area. At operation 500, the method can include emitting laser radiation from a surgical laser. The surgical laser can include a probe laser that emits visible radiation/light, or an ablation laser to emit non-visible radiation. For example, the laser radiation can be infrared light or other non-visible laser radiation to be used for ablation, heating tissue, or the like. In other words, the surgical laser can include at least one ablation laser, at least one probe laser, or one or more of each. In an example, the surgical laser can include multiple laser sources which can be used independently or in conjunction with each other. In an example, one or more of the laser sources included in the surgical laser can be a multi-mode laser configured to produce a laser radiation spatially modulated in phase. The surgical laser can further include an optical fiber which, when connected to the multi-mode laser, can produce multiple small laser spots by converting the phase modulation to light intensity variations which, when reflected off a target (e.g., a kidney stone, a gall stone, a piece of tissue, or the like) can produce a speckle field. In an example, the laser radiation/laser light can be emitted from the surgical laser through the optical fiber and a surgical fiber connected to the optical fiber with an optical connector. In an example, the surgical fiber can include a scope, such as an endoscope or the like, at a distal end of the surgical fiber. The laser radiation can be emitted in a direction so as to be aimed at a target, such as a piece of tissue to be ablated, a stone, or any other similar target in a portion of the body of a patient.

Operation 502 can include collecting at least a portion of reflected laser light at a first time. As the laser radiation/light is reflected off the target, at least a portion of the reflected laser light/laser radiation can be reflected back into the surgical fiber and travel in a direction back toward the surgical laser through the surgical fiber.

In an example, as the portion of the reflected laser light/laser radiation is reflected back into the surgical fiber, it can be collected by an optical splitter or a dedicated fiber included as a part of the surgical laser (e.g., within a housing unit of the surgical laser). In an example, the optical splitter can be a fiber-optic splitter or any other means of collecting and/or directing the reflected laser light. Operation 504 can include analyzing the portion of reflected laser light collected at the first time. The analysis can be performed by a processor, which can be included as a part of an analyzer or system on a chip, or any other processing unit/CPU attached to or included in the surgical laser. In an example, the analysis can include determining an amount of the laser speckles reflected back into the surgical fiber and collected by the optical splitter. In an example, the analysis can be an analysis of the complex curve formed by the oscillation of the speckle field/light intensity, such as applying a Fourier transform to the complex curve and analyzing the frequency represented signal 400B as discussed above for FIGS. 4A-4C.

Operation 506 can include determining a first value for a parameter. In an example, a parameter such as the temperature of the liquid medium, the pressure within the liquid medium, the number of bubbles in the liquid medium, or the like, can be determined from the analysis of the reflected laser light performed in Operation 504. For example, a temperature of the liquid medium (e.g., 36 degrees Celsius), or a pressure of the liquid medium can have a particular known frequency or a particular spectral pattern in the frequency domain. Using the frequency represented signal, the processor can determine a value for the parameter. In an example, the value can be specific or approximate (e.g., within a range), and depending on factors such as type of procedure, patient response during the procedure, or the like, can be deemed safe or acceptable, or unsafe, unacceptable, undesirable, or the like.

Operation 508 can include, in response to a determination that the first value for the parameter is at least one of above an upper threshold, below a lower threshold, or within a range, applying a mitigation. For example, When the frequency value represents a parameter value that is above an upper threshold, below a lower threshold or within an undesired range, the processor can cause a mitigation to be applied. For example, when the frequency shifts an amount that results in an undesirable change in temperature (e.g., a temperature increase of seven degrees Celsius), or an undesirable change in pressure (e.g., a pressure increase of 1000-3000 pascals), an undesirable aggregation of material at the tip of the surgical fiber or scope, or the like, the processor can automatically cause an appropriate mitigation to be applied. In an example, the processor can cause the ablation energy from the ablation laser to be reduced, lowered, cut-off, terminated, ceased, or the like, or cause the duty cycle, pulse width, or the like, to be changed, altered, or the like. Alternatively, the processor can cause, using a position actuator which can optionally be attached to the surgical fiber and/or scope, to reposition, move, change or the like, the location of the tip of the surgical fiber or the scope relative to the target. This can allow for more efficient procedures as the processor can react to changing conditions in the medium faster than a human. As such, the actuator can reposition the tip of the surgical fiber and/or scope as soon as it determines that too much ablation energy is being delivered to the tissue, not enough ablation energy is being delivered to the tissue, or the like, and react accordingly.

Figure 6:
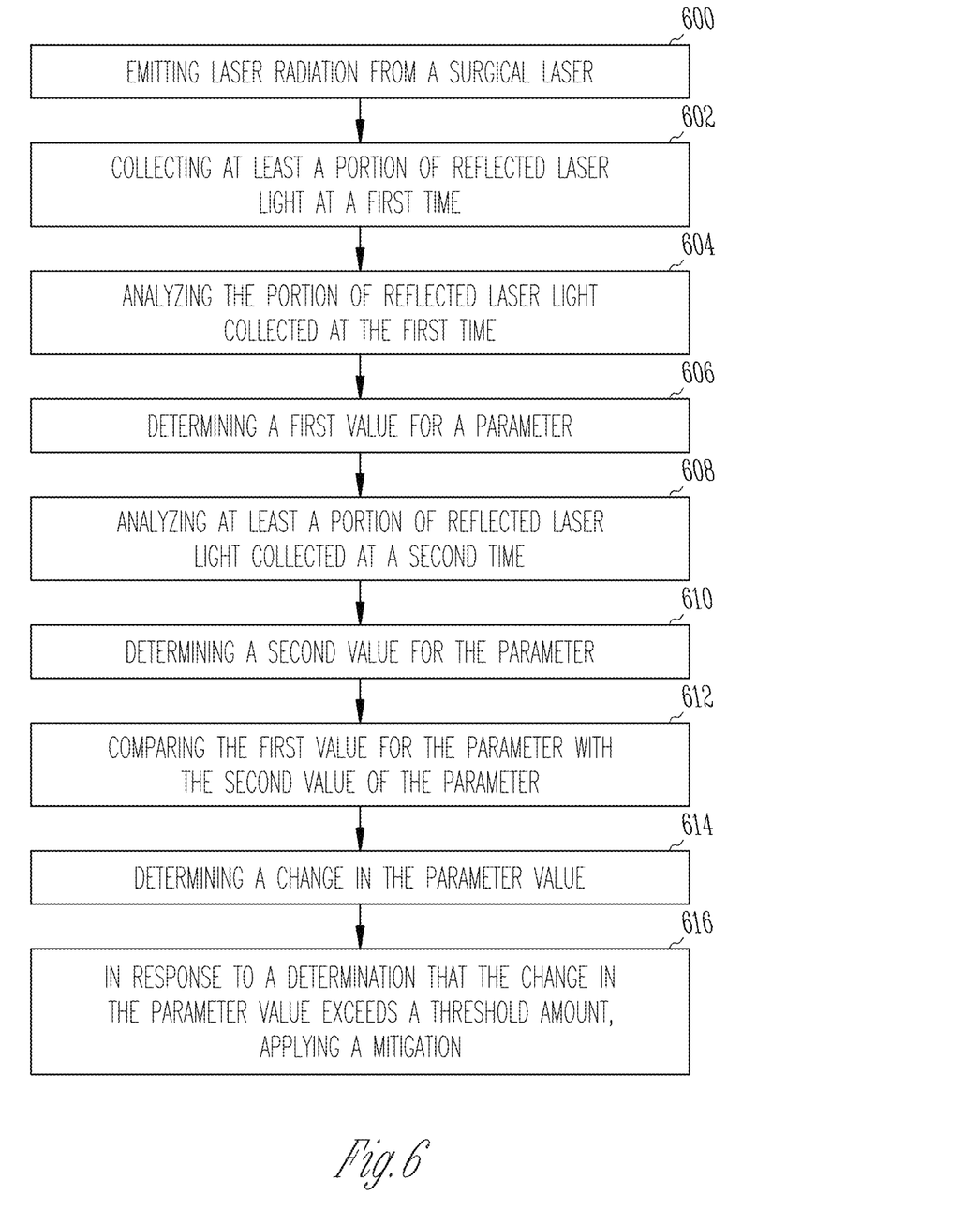
FIG. 6 illustrates an example method for monitoring liquid medium conditions proximate a laser lithotripsy treatment area.

FIG. 6 illustrates an example method for monitoring liquid medium conditions proximate a laser treatment area. Operation 600 can include emitting laser radiation from a surgical laser. Operation 602 can include collecting at least a portion of reflected laser light at a first time. Operation 604 can include analyzing the portion of reflected laser light collected at the first time. Operation 606 can include determining a first value for a parameter. These Operations, 600-606 can be performed in the same or a similar manner as Operations 500-508 as discussed above for FIG. 5. Operation 608 can include collecting at least a portion of reflected laser light at a second time, different from the first time, and analyzing the at least a portion of reflected laser light collected at a second time. In an example, the system can monitor the speckle field at different time intervals, such as every 10 milliseconds or any other desired or appropriate interval. In an example, the reflected light can be collected continuously and analyzed continuously. In an example, the reflected light can be collected in the same or similar manner as discussed above as reflected light travels back through the surgical fiber to the optical splitter.

Operation 610 can include determining a second value for the parameter. In an example, this determination can be made based on the analysis of the portion of laser light collected at the second time in Operation 608 and done in the same or similar manner as Operations 506 and 606. Operation 612 can include comparing the first value for the parameter with the second value of the parameter, and Operation 614 can include determining a change in the parameter value. In an example, the second value of the parameter can be compared against a predetermined threshold value(s) as described above in FIG. 5. As explained above, a parameter such as a temperature of the liquid medium (e.g., 36 degrees Celsius), or a pressure of the liquid medium, or the like, can have a particular known frequency or a particular spectral pattern in the frequency domain, that can be determined when a detector signal such as that shown in 400A is transformed to the frequency domain as shown in 400B.

The frequency can shift as the value of the parameter changes, such as at a higher temperature, an increase in pressure, or the like. Hence, the shift can denote a change in the parameter. Operation 616 can include in response to a determination that the change in the parameter value exceeds a threshold amount, applying a mitigation. For example, when the frequency shifts an amount that results in an undesirable change in temperature (e.g., a temperature increase of seven degrees Celsius), or an undesirable change in pressure (e.g., a pressure increase of 1000-3000 pascals), an undesirable aggregation of material at the tip of the surgical fiber or scope, or the like, the processor can automatically cause an appropriate mitigation to be applied. The mitigation may include causing a controller such as controller 114 to cause a surgical fiber actuator such as surgical fiber actuator 122 configured to be connected to the surgical fiber to adjust a location of at least a portion of the surgical fiber. For example, the surgical fiber actuator 122 can cause a portion of the surgical fiber such as the tip of the surgical fiber or the portion of the surgical fiber connected to a scope, such as scope 124 to change its location (e.g., move closer to the target). In an example, the mitigation can include causing a change in the intensity, duty cycle, pulse width, or the like, of the emitted laser radiation/light (e.g., stopping, reducing, lowering, or the like), or the mitigation can be to cause irrigation fluid (or change the flow rate of irrigation fluid) such as saline to be emitted from the scope 124. It is understood that any one of these mitigation techniques or any other suitable mitigation technique can be applied independently or in conjunction with each other as desired or appropriate. In an example, the processor 112 can be configured to select and automatically apply one or more suitable mitigation techniques based on the value(s) of the parameter(s) determined in steps 606, 610. By configuring the processor to automatically select and apply an appropriate mitigation based on the analysis of the reflected laser light and the determined value of the parameter, the system can provide increased ablation efficiency as the processor can cause the mitigation to be applied, faster, more quickly, more precisely, or the like, than can be done by a human.

Figure 7:
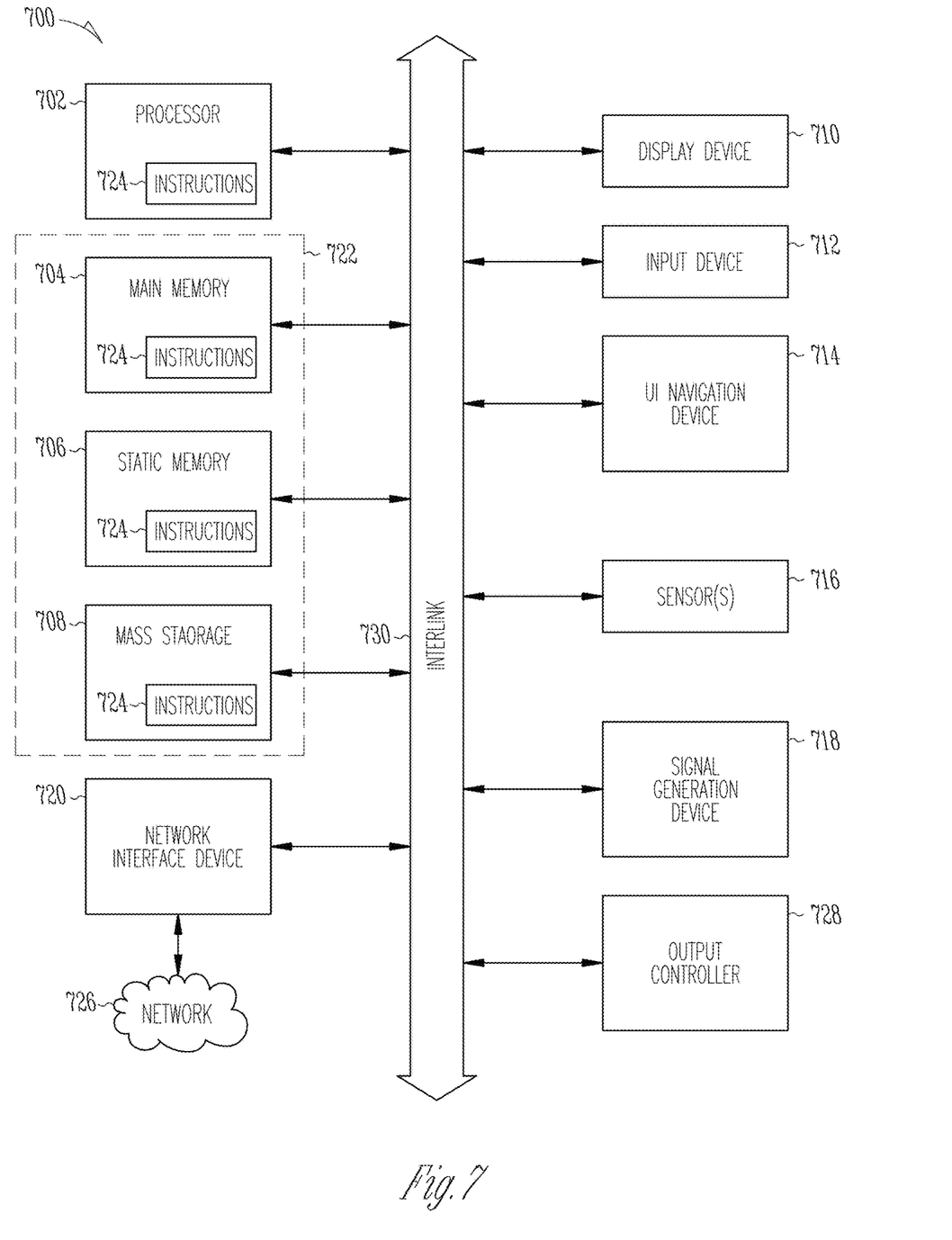
FIG. 7 illustrates an example of a block diagram of a machine upon which any one or more of the techniques herein may perform.

FIG. 7 illustrates an example of a block diagram of a machine upon which any one or more of the techniques herein may perform. In alternative embodiments, the machine 700 may operate as a standalone device or may be connected (e.g., networked) to other machines. For example, the machine 700 can be a part or component of the surgical laser, a component operably connected to the surgical laser, or the like. The machine 700 can also be a personal computer (PC), a tablet PC, a control system, a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Examples, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, circuits, etc.) and a computer readable medium containing instructions, where the instructions configure the execution units to carry out a specific operation when in operation. The configuring can occur under the direction of the execution's units or a loading mechanism. Accordingly, the execution units are communicatively coupled to the computer readable medium when the device is operating. In this example, the execution units can be a member of more than one module. For example, under operation, the execution units can be configured by a first set of instructions to implement a first module at one point in time and reconfigured by a second set of instructions to implement a second module.

Machine (e.g., computer system) 700 can include a hardware processor 702 (e.g., a central processing unit (CPU), a graphics processing unit (GPU), a hardware processor core, or any combination thereof), a main memory 704 and a static memory 706, some or all of which can communicate with each other via an interlink (e.g., bus) 730. The machine 700 can further include a display unit 710, an alphanumeric input device 712 and a user interface (UI) navigation device 714. In an example, the display unit 710, alphanumeric input device 712 and UI navigation device 714 can be a touch screen display. The machine 700 can additionally include a storage device (e.g., drive unit) 708, a signal generation device 718 (e.g., a speaker), a network interface device 720, and one or more sensors 716, such as a global positioning system (GPS) sensor, accelerometer, or another sensor. The machine 700 can include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, a card reader, etc.).

The storage device 708 can include a machine readable medium 722 that is non-transitory on which is stored one or more sets of data structures or instructions 724 (e.g., software) embodying or utilized by any one or more of the techniques or functions described herein. The instructions 724 can also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 708 can constitute machine readable media.

While the machine readable medium 722 is illustrated as a single medium, the term "machine readable medium" can include a single medium or multiple media (e.g., a centralized or distributed database, or associated caches and servers) configured to store the one or more instructions 724.

The term "machine readable medium" can include any non-transitory medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples can include solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 can further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 can include one or more physical jacks (e.g., Ethernet, coaxial, or phone jacks) or one or more antennas to connect to the communications network 726. In an example, the network interface device 720 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

Figure 8:
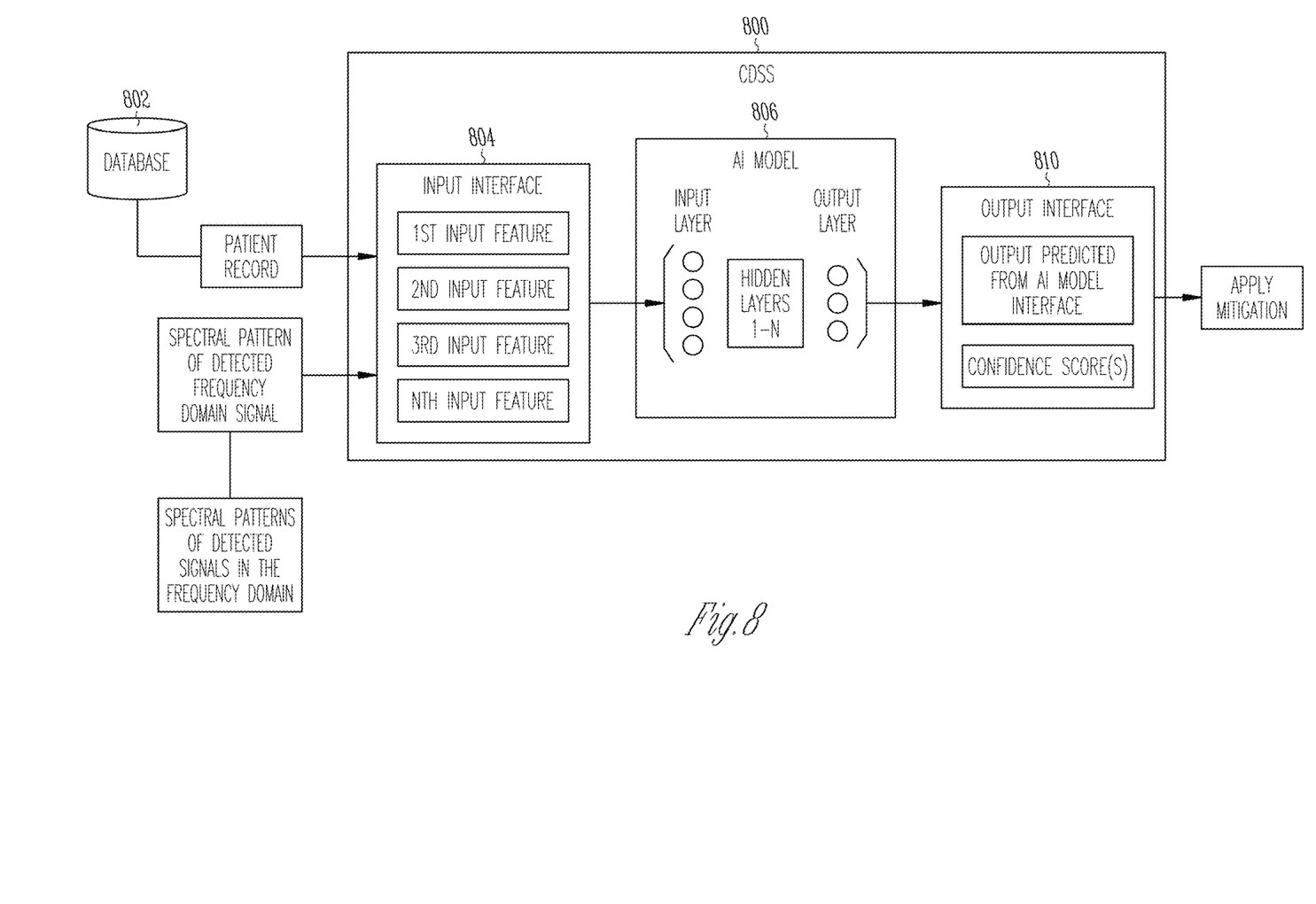
FIG. 8 illustrates an example of a computer-based decision support system (CDSS).

FIG. 8 illustrates an example of a computer-based decision support system (CDSS). In an example the (CDSS) 800 can be configured to determine a condition (or a change in the condition) of the liquid medium based the spectral patterns of the detected signals in the frequency domain. In various embodiments, the CDSS 800 includes an input interface 804 through which the spectral patterns of the detected signal in the frequency domain which are specific to a patient are provided as input features to an artificial intelligence (AI) model 806, a processor, such as processor 702 can perform an inference operation in which the detected signal in the frequency domain are applied to the AI model to generate determined condition of the medium, and a user interface (UI) through which the determined condition of the medium is communicated to a user, e.g., a clinician.

In some embodiments, the input interface 804 may be a direct data link between the CDSS 800 and one or more medical devices that generate at least some of the input features. For example, the input interface 806 may transmit the spectral patterns of the detected signals in the frequency domain directly to the CDSS during a therapeutic and/or diagnostic medical procedure. Additionally, or alternatively, the input interface 806 may be a classical user interface that facilitates interaction between a user and the CDSS 800. Additionally, or alternatively, the input interface 804 may provide the CDSS 800 with access to an electronic patient record from which one or more input features may be extracted. In any of these cases, the input interface 804 is configured to collect one or more of the following input features in association with a specific patient on or before a time at which the CDSS 800 is used to determine a condition of the medium.

Based on one or more of the above input features, the processor 702 performs an inference operation using the AI model to generate the determined condition of the medium. For example, input interface 804 may deliver the spectral patterns of the detected signals in the frequency domain into an input layer of the AI model which propagates these input features through the AI model to an output layer. The AI model can provide a computer system the ability to perform tasks, without explicitly being programmed, by making inferences based on patterns found in the analysis of data. AI model explores the study and construction of algorithms (e.g., machine-learning algorithms) that may learn from existing data and make predictions about new data. Such algorithms operate by building an AI model from example training data in order to make data-driven predictions or decisions expressed as outputs or assessments.

There are two common modes for machine learning (ML): supervised ML and unsupervised ML. Supervised ML uses prior knowledge (e.g., examples that correlate inputs to outputs or outcomes) to learn the relationships between the inputs and the outputs. The goal of supervised ML is to learn a function that, given some training data, best approximates the relationship between the training inputs and outputs so that the ML model can implement the same relationships when given inputs to generate the corresponding outputs. Unsupervised ML is the training of an ML algorithm using information that is neither classified nor labeled, and allowing the algorithm to act on that information without guidance. Unsupervised ML is useful in exploratory analysis because it can automatically identify structure in data.

Common tasks for supervised ML are classification problems and regression problems. Classification problems, also referred to as categorization problems, aim at classifying items into one of several category values (for example, is this object an apple or an orange?). Regression algorithms aim at quantifying some items (for example, by providing a score to the value of some input). Some examples of commonly used supervised-ML algorithms are Logistic Regression (LR), Naive-Bayes, Random Forest (RF), neural networks (NN), deep neural networks (DNN), matrix factorization, and Support Vector Machines (SVM).

Some common tasks for unsupervised ML include clustering, representation learning, and density estimation. Some examples of commonly used unsupervised-ML algorithms are K-means clustering, principal component analysis, and autoencoders.

Another type of ML is federated learning (also known as collaborative learning) that trains an algorithm across multiple decentralized devices holding local data, without exchanging the data. This approach stands in contrast to traditional centralized machine-learning techniques where all the local datasets are uploaded to one server, as well as to more classical decentralized approaches which often assume that local data samples are identically distributed. Federated learning enables multiple actors to build a common, robust machine learning model without sharing data, thus allowing to address critical issues such as data privacy, data security, data access rights and access to heterogeneous data.

In some examples, the AI model may be trained continuously or periodically prior to performance of the inference operation by the processor 702. Then, during the inference operation, the patient specific input features provided to the AI model may be propagated from an input layer, through one or more hidden layers, and ultimately to an output layer that corresponds to the determined condition of the medium. For example, an amplitude of a frequency represented signal can be measured and correlated to a parameter/characteristic present in the liquid medium such as temperature, pressure, an amount of bubbles present, or the like. Then, by applying the learned correlation and the detected real-time intensity of the reflected speckles, the condition of the medium can be determined.

During and/or subsequent to the inference operation, the determined condition of the medium can be communicated to the user via the user interface (UI) and/or automatically cause a surgical fiber or scope connected to the processor 702 for performing a desired action (such as applying a mitigation). For example, based on the determined condition of the medium, the processor can cause the surgical fiber actuator 122 to adjust at location of at least a portion of the surgical fiber to change its location (e.g., move closer to a target). Additionally or alternatively, the determination may cause the processor to cause a change in the intensity, duty cycle, pulse width, or the like, of the emitted laser radiation/light (e.g., stopping, reducing, lowering, or the like), or to cause irrigation fluid (or change the flow rate of irrigation fluid) such as saline to be emitted from the scope 124.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness can in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element can still actually contain such element as long as there is generally no significant effect thereof.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

Various Notes & Examples

Each of these non-limiting examples may stand on its own, or may be combined in various permutations or combinations with one or more of the other examples.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Example 1 is a system comprising: a surgical laser; a surgical fiber coupled to the surgical laser for delivering laser light to a target region and receiving at least a portion of laser light reflected from the target region at a first time; and a processor configured to: analyze the received at least a portion of the reflected laser light; and determine, based at least in part on the analysis of the reflected laser light, a first value of a parameter associated with a medium proximate the target region.

In Example 2, the subject matter of Example 1 optionally includes wherein the processor is further operable to: in response to a determination that the first value of the parameter is at least one of above an upper threshold value, below a lower threshold value, within a first range, or beyond a second range, cause a mitigation to be applied.

In Example 3, the subject matter of Example 2 optionally includes a surgical fiber actuator configured to be connected to the surgical fiber and to adjust a location of at least a portion the surgical fiber, and wherein the mitigation includes causing the surgical fiber actuator to adjust a location of the at least a portion of the surgical fiber with respect to the target region.

In Example 4, the subject matter of any one or more of Examples 2-3 optionally include wherein the mitigation includes a change in at least one of an intensity, a duty cycle, or a pulse width of the laser light emitted from the surgical laser.

In Example 5, the subject matter of any one or more of Examples 2-4 optionally include wherein the mitigation is to (i) cause an irrigation fluid to be emitted from a fluid source to the target region or (ii) adjust a flow rate of the irrigation fluid.

In Example 6, the subject matter of any one or more of Examples 2-5 optionally include wherein the processor is further configured to: analyze at least a portion of reflected laser light collected by the optical splitter at a second time, different from the first time; determine, based at least in part on the analysis of the reflected laser light collected by the optical splitter at the second time, a second value of the parameter; compare the second value of the parameter against at least one of the first value of the parameter, the upper threshold value, the lower threshold value, the first range or the second range; determine a change in the parameter value based at least in part on the comparison; and in response to a determination that the change in the parameter value exceeds a threshold amount, cause a mitigation to be applied.

In Example 7, the subject matter of any one or more of Examples 1-6 optionally include wherein to analyze the received at least a portion of the reflected laser light includes: computationally transforming the received at least a portion of the reflected laser light from a time domain signal into a frequency domain signal; and determining a change in the frequency domain signal over a period of time.

In Example 8, the subject matter of Example 7 optionally includes wherein the change is in at least one of an amplitude or a pattern associated with the frequency domain signal.

In Example 9, the subject matter of any one or more of Examples 7-8 optionally include wherein the frequency domain signal corresponds to the parameter associated with the medium proximate the target region, and wherein the change in the frequency domain signal represents the change in the parameter value.

In Example 10, the subject matter of any one or more of Examples 7-9 optionally include wherein to analyze the collected at least a portion of the reflected laser light further includes: determining, using a machine learning model, a correlation between a spectral pattern in the frequency domain signal and a condition of the medium proximate the target region.

In Example 11, the subject matter of any one or more of Examples 1-10 optionally include wherein the parameter comprises at least one of a temperature, a pressure, or an amount of bubbles in the medium.

In Example 12, the subject matter of any one or more of Examples 1-11 optionally include wherein the surgical fiber is configured to couple to a surgical scope for obtaining imaging information about the target region.

In Example 13, the subject matter of any one or more of Examples 1-12 optionally include wherein the target region comprises at least one of a kidney stone or a body tissue.

In Example 14, the subject matter of any one or more of Examples 1-13 optionally include wherein the surgical laser comprises a multi-mode laser and the surgical fiber comprises a multi-mode optical fiber.

In Example 15, the subject matter of any one or more of Examples 1-14 optionally include wherein to analyze the collected at least a portion of the reflected laser light includes to: detect an amount of laser light speckles in the reflected laser light passing through the at least a portion of the surgical fiber; and/or detect a movement of the laser light speckles in the reflected laser light passing through the at least a portion of the surgical fiber.

Example 16 is a method for monitoring a condition associated with a medium proximate a target region, the method comprising: emitting laser light to the target region; collecting at least a portion of laser light reflected from the target region at a first time; analyzing the collected at least a portion of the reflected laser light; and determining, based at least in part on the analysis of the collected laser light, a first value of a parameter associated with the medium proximate the target region.

In Example 17, the subject matter of Example 16 optionally includes in response to a determination that the first value of the parameter is at least one of above an upper threshold value, below a lower threshold value, within a first range, or beyond a second range, applying a mitigation.

In Example 18, the subject matter of Example 17 optionally includes wherein the mitigation includes a change in at least one of an intensity, a duty cycle, or a pulse width of the laser light emitted to the target region.

In Example 19, the subject matter of any one or more of Examples 17-18 optionally include wherein the mitigation is to (i) cause an irrigation fluid to be emitted from a fluid source to the target region or (ii) adjust a flow rate of the irrigation fluid.

In Example 20, the subject matter of any one or more of Examples 17-19 optionally include analyzing at least a portion of reflected laser light collected at a second time, different from the first time; determining, based at least in part on the analysis of the reflected laser light at the second time, a second value of the parameter; comparing the second value of the parameter against at least one of the first value of the parameter, the upper threshold value, the lower threshold value, the first range or the second range; determining a change in the parameter value based at least in part on the comparison; and in response to a determination that the change in the parameter value exceeds a threshold amount, applying a mitigation.

In Example 21, the subject matter of any one or more of Examples 16-20 optionally include wherein the collected at least a portion of laser light reflected from the target region is in a time domain, the method further comprising: transforming the collected time domain signal into a frequency domain signal, wherein the frequency domain signal corresponds to the parameter associated with the medium proximate the target region; and determining a change in the frequency domain signal over a period of time, wherein the change in the frequency domain signal represents a change in the parameter value.

In Example 22, the subject matter of Example 21 optionally includes wherein the change is in at least one of an amplitude or a pattern associated with the frequency domain signal.

In Example 23, the subject matter of any one or more of Examples 21-22 optionally include determining, using a machine learning model, a correlation between a spectral pattern in the frequency domain signal and a condition of the medium or a change in condition of the medium.

In Example 24, the subject matter of any one or more of Examples 16-23 optionally include wherein the parameter comprises at least one of a temperature, a pressure, or an amount of bubbles in the medium, and wherein the target region comprises at least one of a kidney stone or a body tissue.

In Example 25, the subject matter of any one or more of Examples 16-24 optionally include wherein analyzing the collected at least a portion of the reflected laser light includes: detecting an amount of laser light speckles in the reflected laser light; and/or detecting a movement of the laser light speckles in the reflected laser light.

What is claimed is:

1. A system comprising:
a surgical laser;
a surgical fiber coupled to the surgical laser for delivering laser light to a target region and receiving at least a portion of laser light reflected from the target region at a first time;
a sensor configured to convert at least a portion of the reflected laser light received at the sensor into an electrical signal; and
a processor configured to:
analyze, during a surgical procedure, the electrical signal converted from the received at least a portion of the reflected laser light, including by transforming the electrical signal from a time domain signal into a frequency domain signal;
determine, during the surgical procedure, based at least in part on the analysis of the electrical signal, a first value of a parameter associated with a medium proximate the target region, wherein specific frequencies in the frequency domain signal directly correspond to different parameters associated with the medium proximate the target region, wherein a first specific frequency corresponds to a temperature associated with the medium, a second specific frequency corresponds to a pressure associated with the medium, and a third specific frequency corresponds to an amount of bubbles associated with the medium, and wherein a change in one or more specific frequencies in the frequency domain signal represents a change in the corresponding parameter value; and
cause a mitigation control signal configured to control the surgical laser or the surgical fiber to be applied to at least one of the surgical laser or the surgical fiber during the surgical procedure based on one or more of the determined first value of the parameter or the change in the one or more specific frequencies in the frequency domain signal.

2. The system of claim 1, wherein the processor is further operable to:
in response to a determination that the first value of the parameter is at least one of above an upper threshold value, below a lower threshold value, within a first range, or beyond a second range, cause a mitigation to be applied.

3. The system of claim 2, further comprising:
a surgical fiber actuator configured to be connected to the surgical fiber and to adjust a location of at least a portion the surgical fiber, and wherein the mitigation includes causing the surgical fiber actuator to adjust a location of the at least a portion of the surgical fiber with respect to the target region.

4. The system of claim 2, wherein the mitigation includes a change in at least one of an intensity, a duty cycle, or a pulse width of the laser light emitted from the surgical laser.

5. The system of claim 2, wherein the mitigation is to (i) cause an irrigation fluid to be emitted from a fluid source to the target region or (ii) adjust a flow rate of the irrigation fluid.

6. The system of claim 2, wherein the at least a portion of the reflected laser light is collected at a first time by an optical splitter, and wherein the processor is further configured to:
analyze at least a portion of reflected laser light collected by the optical splitter at a second time, different from the first time;
determine, based at least in part on the analysis of the reflected laser light collected by the optical splitter at the second time, a second value of the parameter;
compare the second value of the parameter against at least one of the first value of the parameter, the upper threshold value, the lower threshold value, the first range or the second range;
determine a change in the parameter value based at least in part on the comparison; and
in response to a determination that the change in the parameter value exceeds a threshold amount, cause a mitigation to be applied.

7. The system of claim 1, wherein to analyze the received at least a portion of the reflected laser light includes:
computationally transforming the received at least a portion of the reflected laser light from a time domain signal into a frequency domain signal; and
determining a change in the frequency domain signal over a period of time.

8. The system of claim 7, wherein the change is in at least one of an amplitude or a pattern associated with the frequency domain signal.

9. The system of claim 7, wherein the frequency domain signal corresponds to the parameter associated with the medium proximate the target region, and wherein the change in the frequency domain signal represents the change in the parameter value.

10. The system of claim 7, wherein to analyze the at least a portion of the reflected laser light further includes:
determining, using a machine learning model, a correlation between a spectral pattern in the frequency domain signal and a condition of the medium proximate the target region.

11. The system of claim 1, wherein the parameter comprises at least one of a temperature, a pressure, or an amount of bubbles in the medium.

12. The system of claim 1, wherein the surgical fiber is configured to couple to a surgical scope for obtaining imaging information about the target region.

13. The system of claim 1, wherein the target region comprises at least one of a kidney stone or a body tissue.

14. The system of claim 1, wherein the surgical laser comprises a multi-mode laser and the surgical fiber comprises a multi-mode optical fiber.

15. The system of claim 1, wherein to analyze the at least a portion of the reflected laser light includes to:
detect an amount of laser light speckles in the reflected laser light passing through the at least a portion of the surgical fiber; and/or detect a movement of the laser light speckles in the reflected laser light passing through the at least a portion of the surgical fiber.

16. A method for monitoring a condition associated with a medium proximate a target region, the method comprising:
emitting laser light from a surgical laser to the target region;
collecting at least a portion of laser light reflected from the target region at a first time;
analyzing, during a surgical procedure, an electrical signal received from a sensor, the electrical signal converted from the collected at least a portion of the reflected laser light, including by transforming the electrical signal from a time domain signal into a frequency domain signal;
determining, during the surgical procedure, based at least in part on the analysis of the electrical signal, a first value of a parameter associated with the medium proximate the target region, wherein specific frequencies in the frequency domain signal directly correspond to different parameters associated with the medium proximate the target region, wherein a first specific frequency corresponds to a temperature associated with the medium, a second specific frequency corresponds to a pressure associated with the medium, and a third specific frequency corresponds to an amount of bubbles associated with the medium, and wherein a change in one or more specific frequencies in the frequency domain signal represents a change in the corresponding parameter value; and
applying a mitigation control signal configured to control the surgical laser or a surgical laser fiber connected to the surgical laser to at least one of the surgical laser or the surgical laser fiber during the surgical procedure based on one or more of the determined first value of the parameter or the change in the one or more specific frequencies in the frequency domain signal.

17. The method of claim 16, further comprising:
in response to a determination that the first value of the parameter is at least one of above an upper threshold value, below a lower threshold value, within a first range, or beyond a second range, applying a mitigation.

18. The method of claim 17, wherein the mitigation includes a change in at least one of an intensity, a duty cycle, or a pulse width of the laser light emitted to the target region.

19. The method of claim 17, wherein the mitigation is to (i) cause an irrigation fluid to be emitted from a fluid source to the target region or (ii) adjust a flow rate of the irrigation fluid.

20. The method of claim 17, further comprising:
analyzing at least a portion of reflected laser light collected at a second time, different from the first time;
determining, based at least in part on the analysis of the reflected laser light at the second time, a second value of the parameter;
comparing the second value of the parameter against at least one of the first value of the parameter, the upper threshold value, the lower threshold value, the first range or the second range;
determining a change in the parameter value based at least in part on the comparison; and
in response to a determination that the change in the parameter value exceeds a threshold amount, applying a mitigation.

21. The method of claim 16, wherein the collected at least a portion of laser light reflected from the target region is in a time domain, the method further comprising:
transforming the collected time domain signal into a frequency domain signal, wherein the frequency domain signal corresponds to the parameter associated with the medium proximate the target region; and
determining a change in the frequency domain signal over a period of time, wherein the change in the frequency domain signal represents a change in the parameter value.

22. The method of claim 21, wherein the change is in at least one of an amplitude or a pattern associated with the frequency domain signal.

23. The method of claim 21, further comprising:
determining, using a machine learning model, a correlation between a spectral pattern in the frequency domain signal and a condition of the medium or a change in condition of the medium.

24. The method of claim 16 wherein the parameter comprises at least one of a temperature, a pressure, or an amount of bubbles in the medium, and wherein the target region comprises at least one of a kidney stone or a body tissue.

25. The method of claim 16, wherein analyzing the collected at least a portion of the reflected laser light includes:
detecting an amount of laser light speckles in the reflected laser light; and/or
detecting a movement of the laser light speckles in the reflected laser light.

* * * * *

UNITED STATES PATENT AND TRADEMARK OFFICE
CERTIFICATE OF CORRECTION

PATENT NO. : 12,478,429 B2  
APPLICATION NO. : 17/820297  
DATED : November 25, 2025  
INVENTOR(S) : Polejaev et al.

Page 1 of 1

It is certified that error appears in the above-identified patent and that said Letters Patent is hereby corrected as shown below:

In the Claims

In Column 19, Line 8, in Claim 15, after "and/or", insert a linebreak

Signed and Sealed this  
Sixth Day of January, 2026

John A. Squires  
*Director of the United States Patent and Trademark Office*